3,444,113
LOW TEMPERATURE CURABLE WOOD COATING COMPOSITION

Joseph Francis Ackerman, Cedar Grove, and Eliakum Gustave Shur, Union, N.J., assignors to Interchemical Corporation, New York, N.Y., a corporation of Ohio
No Drawing. Filed Dec. 3, 1964, Ser. No. 415,804
Int. Cl. C08g 37/34, 37/32
U.S. Cl. 260—21                                                6 Claims

ABSTRACT OF THE DISCLOSURE

Low temperature curable wood coating compositions are prepared from solution blends of a copolymer of styrene and a half-ester of fumaric or maleic acid, an alkyd resin, and a urea-formaldehyde resin. These compositions are capable of rapid curing at relatively low temperatures and provide coatings of high flexibility and toughness.

---

This invention relates to a novel coating composon, particularly useful in coating wood products such as wood, plywood, fiberboard and chipboard. These wood products require coating compositions which are capable of being cured at low temperatures because the wood is adversely affected by the high temperatures usually used in many coating operations.

The coating composition of this invention can be rapidly cured with conventional acid catalysts at low curing temperatures in the range of 32 to 60° C. to provide coatings of high flexibility and toughness.

The coatings of our invention comprise solutions in volatile organic solvents of blends of three resinous components: (1) copolymers comprising the copolymerization product of styrene and half-esters formed by the half esterification of an alpha-beta unsaturated carboxylic acid such as fumaric or maleic acid with at least one $C_{12}$ to $C_{20}$ aliphatic alcohol which is preferably lauryl alcohol but may also be either myristyl, palmityl, stearyl or arachidyl alcohols; (2) alkyd resins formed by the condensation polymerization of a polycarboxylic acid and a polyhydric alcohol, and (3) urea-formaldehyde resins. In accordance with conventional procedure, urea-formaldehyde resins are preferably alkylated or etherified with lower alkanols such as methanol or butanol in order to increase their solubility in organic solvents. This may be conveniently accomplished by preparing the urea-aldehyde resins in solutions containing the lower alkanols.

The copolymers (1) comprise the copolymerization product of styrene and the half-ester formed by the half-esterification of an alpha-beta unsaturated dicarboxylic acid such as fumaric or maleic acids with an alkanol which has 12 to 20 carbons preferably 12 to 16 carbons and most preferably lauryl alcohol. In addition to these high carbon content alkanols, the alkanol component of these half-esters may further comprise minor amounts of lower alkanols such as butanol.

In preparing the copolymers used in the coating the half-ester is first formed by esterifying the alkanol with the alpha-beta unsaturated acid preferably at a temperature in the range of from 77 to 149° C., after which the half ester is polymerized, using a conventional addition polymerization catalyst, with styrene. During the formation of the half-ester from about 1.1 to 5.0 moles of alkanol are preferably added for each mole of alpha-beta unsaturated acid. During the copolymerization, preferably about from 0.5 to 2 moles and most preferably 1 mole of styrene are added for each mole of alpha-beta acid originally present. The copolymerization is preferably conducted at a temperature of from 93 to 121° C.

Unless otherwise indicated, all proportions set forth in this specification and claims are by weight.

The alkyd resin is preferably a glyceryl-phthalate alkyd which may be oil-modified. Also excellent results have been obtained using a glyceryl-phthalate alkyd containing copolymerized acrylate material such as methyl methacrylate. However, alkyds in general are adequate for the practice of this invention.

Alkyd resins are defined as the resinous esters of the reaction of polybasic acids such as phthalic and maleic acids and their anhydrides and polyhydric alcohols such as glycerol and pentaerytiritol. In a great many alkyds, the resinous ester is modified with drying, semi-drying and non-drying oils. Drying oil alkyds are alkyds which dry in air and are modified by the fatty acids of drying oils such as linseed oil, dehydrated castor oil, menhaden oil and perilla oil. Semi-drying oil alkyds are alkyds which dry on baking and are modified by the fatty acids of semi-drying oils such as soya bean oil. Non-drying alkyds are alkyds which normally do not dry even on baking and are modified by the fatty acids of non-drying oils such as coconut oil, castor oil and cottonseed oil.

The preparation and physical properties of alkyd resins are described in numerous texts, such as vol. I to "Organic Coating Technology," Henry Fleming Payne, John Wiley and Sons, Inc., New York, 1954.

The polycarboxylic acids used in the preparation of the alkyds may be any of those generally employed in the preparation of this type of resin. These acids may possess two, three, four, or more carboxyl groups and may be aliphatic, alicyclic, heterocyclic, or aromatic and may be saturated or unsaturated. Examples of such acids are malonic, glutaric, succinic, suberic, citric, tricarballylic, cyclohexanedicarboxylic, maleic, fumaric, itaconic, citraconic, mesaconic, phthalic, isophthalic, terephthalic, 1,8-naphthalic, adipic, sebacic, azeleic, pimelic, chlorosuccinic, bromomaleic, and dichlorophthalic.

Phthalic acid is the preferred acid. (The phthallic acid may of course be in the form of its anhydride.)

Alkyd-resin-forming polyhydric alcohols which are operable in preparing the alkyd resins used in the present invention include trihydric alcohols such as glycerol, tetrahydric alcohols such as erythritol, and pentaerythritol, and hexahydric alcohols such as mannitol and sorbitol. It will be seen that these alcohols are those which are conventionally used in preparing alkyd resins and our experiments indicate that the invention is operable with alkyd-resin-forming polyhydric alcohols in general. The term "alkyd-resin-forming polyhydric alcohol" is meant to include polyhydric compounds which are conventionally used in the manufacture of alkyds and which, as those persons skilled in the art know, do not contain all sorts of reactive substituents which alter the course of the alkyd-resin-forming reaction. Such substances as cellulose, starch and sugars are therefore excluded. The polyhydric alcohols, which are alkyd-resin-forming polyhydric alcohols, are in general, polyhydric alcohols containing from three to about ten hydroxyl groups, and containing no other substituent groups that are reactive under the conditions used in preparing alkyd resins. A minor amount of dihydric alcohols can be used along with the higher polyfunctional alcohols if desired.

In addition, alkyd resins known as resinous plasticizers, glycol, glycerol or polyglycol sebacates may be also used in the practice of this invention.

The solvents used in the coating compositions of this invention are primarily aromatic hydrocarbons such as xylene, toluene or benzene. Minor amounts, up to 14% of alkanols may be present.

Preferably from 0.75 to 2.25 parts of unrea-formaldehyde resin and from 0.3 to 3.7 parts of alkyd resin are used for each part of the copolymer containing the half ester.

It will be understood by those skilled in the art that these coating compositions may be pigmented with conventional pigments in conventional proportions.

The following examples will further illustrate this invention.

Example 1

A copolymer of styrene and the half ester of maleic anhydride and lauryl and butyl alcohols is prepared as follows:

Heat 196 g. of maleic anhydride, 162 g. of lauryl alcohol and 84 g. of n-butyl alcohol to reflux and maintain at reflux until the temperature starts to drop. Add 200 g. of xylene an then add 208 g. styrene and 4 g. of benzoyl peroxide over a period of 10 minutes at 120° C. Next add 10 g. of n-butyl alcohol and 100 g. of xylol at a temperature of 130° C. Then add 100 g. of butanol and 4 g. of tertiary butyl perbenzoate slowly to the mixture over a period of 4 hours at 130° C. and maintain at 130° C. for an additional hour, after which add 140 g. of butanol and 710 g. of xylene and continue to heat at 130° C. until a viscosity of Y–2 on the Gardner-Holdt scale is reached and the solution has a solids content of 47 to 50% by weight.

Example 2

Example 1 is repeated using the same ingredients, proportions, procedure and conditions except that in place of the lauryl alcohol, there is used a mixture of the following alcohols: lauryl alcohol ($C_{12}$) 61%, myristyl alcohol ($C_{14}$) 25% and palmityl alcohol ($C_{16}$) 14%.

Example 3

The following components are blended into a coating solution:

| | Parts by weight |
|---|---|
| A solution of the copolymer of Example 1 in xylene having a 49% copolymer content | 16.9 |
| A solution of buylated urea-formaldehyde resin in 3:2 butanol:xylene solvent having a 60% resin content | 23.6 |
| A 60% solution in xylene of an oil modified alkyd resin made from 31% phthalic anhydride, 46% dehydrated castor oil fatty acids, 14.7% pentaerythritol, 7.8 glycerine and 0.5% maleic anhydride | 20.5 |
| Polyethylene wax having a molecular weight of about 2000 | 0.5 |
| Xylene | 38.5 |

The coating is mixed with an acid catalyst such as p-toluene sulfonic acid in the proportion of about 4 ounces by weight of catalyst solution per gallon of solution and coated onto a plywood substrate and cured at 65° C. for 2 minutes. The coating has a high degree of gloss toughness and flexibility.

Example 4

Example 3 is repeated using the same ingredients, proportions, conditions and procedure except that in place of the solution of the copolymer of Example 1, there is used a 49% solution in xylene of the copolymer of Example 2. The resulting coating composition has the same desirable properties as does the composition of Example 3.

Where there have been described what is at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A coating composition comprising a solution in a volatile organic primarily aromatic solvent of
    (1) one part by weight of a copolymer comprising the copolymerization product of styrene and a half-ester formed by the half esterification of an alpha-beta unsaturated dicarboxylic acid selected from the group consisting of maleic and fumaric acids with lauryl alcohol,
    (2) from 0.3 to 3.7 parts by weight of an alkyd resin formed by the condensation polymerization of a polycarboxylic acid and a polyhydric alcohol per part by weight of the copolymer, and
    (3) from 0.75 to 2.25 parts by weight of a urea-formaldehyde resin per part by weight of copolymer.
2. The coating composition of claim 1 wherein the alpha-beta unsaturated dicarboxylic acid is maleic acid.
3. The coating composition of claim 2 wherein the half-ester is the half-ester of maleic acid with butyl and lauryl alcohols.
4. The coating composition of claim 1 wherein the alkyd-resin is a glyceryl phthalate alkyd.
5. The coating composition of claim 4 wherein the alkyd-resin is an oil modified glyceryl phthalate alkyd.
6. The coating composition of claim 1, further including an acid catalyst.

References Cited

UNITED STATES PATENTS

| | | | |
|---|---|---|---|
| 2,912,399 | 11/1959 | Bartl | 260—27 |
| 2,967,162 | 1/1961 | Vasta | 260—23 |
| 3,139,411 | 6/1964 | Brockman et al. | 260—873 |
| 3,252,927 | 5/1966 | Hoffman | 260—850 |
| 2,963,452 | 12/1960 | Sinn et al. | 260—78.5 |
| 3,250,734 | 5/1966 | Sekmakas | 260—78.5 |
| 3,278,469 | 10/1966 | Pascale | 260—21 |
| 3,342,787 | 9/1967 | Muskat | 260—78.5 |

DONALD E. CZAJA, *Primary Examiner.*

R. W. GRIFFIN, *Assistant Examiner.*

U.S. Cl. X.R.

260—23, 33.4, 33.6, 39, 40, 41, 850, 851, 873; 117—148, 161, 167